(12) United States Patent
McSherry et al.

(10) Patent No.: US 7,464,075 B2
(45) Date of Patent: Dec. 9, 2008

(54) PERSONALIZATION OF WEB PAGE SEARCH RANKINGS

(75) Inventors: Frank David McSherry, San Francisco, CA (US); Demetrios Achlioptas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 10/752,384

(22) Filed: Jan. 5, 2004

(65) Prior Publication Data

US 2005/0149502 A1  Jul. 7, 2005

(51) Int. Cl.
    *G06F 17/30* (2006.01)
(52) U.S. Cl. .......... 707/3; 2/4; 2/5; 2/7; 2/101
(58) Field of Classification Search ........... 707/1–10, 707/104.1; 704/8; 709/224
    See application file for complete search history.

(56) References Cited

U.S. PATENT DOCUMENTS

| | | | |
|---|---|---|---|
| 6,560,600 B1 | 5/2003 | Broder | |
| 6,735,589 B2 | 5/2004 | Bradley et al. | |
| 6,757,646 B2 * | 6/2004 | Marchisio | 704/8 |
| 2003/0050909 A1 * | 3/2003 | Preda et al. | 707/1 |
| 2003/0204502 A1 * | 10/2003 | Tomlin et al. | 707/5 |
| 2005/0033742 A1 * | 2/2005 | Kamvar et al. | 707/7 |
| 2005/0071465 A1 * | 3/2005 | Zeng et al. | 709/224 |
| 2005/0086260 A1 * | 4/2005 | Canright et al. | 707/104.1 |

OTHER PUBLICATIONS

Taher Haveliwala, S. Kamvar and G. Jeh. "An analytical comparison of approaches to personalizing PageRank". Technical report, Stanford University, Jun. 2003.*
Haveliwala, Efficient computation of PageRank. Technical report, Stanford University, Stanford, CA, 1999.*
L. Page, S. Brin, R. Motwani, T. Winograd, "The PageRank citation ranking: Bringing order to the Web," Stanford Digital Library Technologies Project, 1999.*
Golub, G., and Van Loan, C., *Matrix Computations, Third Edition*, Johns Hopkins Univ. Press, 1996, pp. 69-74.
Will, T., "Introduction to the Singular Value Decomposition", Nov. 2003, printed May 13, 2005 <http://www.uwlax.edu/faculty/will/svd>.
Jeh, et al.; Scaling personalized web search; *Stanford University Technical Report*, 2002.
Achlioptas, et al.; "Fast computation of low rank matrix approximations", in *Proceedings of the thirty-third annual ACM symposium on Theory of computing*, Hersonissos, Greece, pp. 611-618, 2001.

* cited by examiner

*Primary Examiner*—Khanh B Pham
(74) *Attorney, Agent, or Firm*—Woodcock Washburn LLP (57) ABSTRACT

Methods and systems are provided for efficiently computing personalized rankings of web pages or other interconnected objects. The personalized rankings are produced by efficiently computing an approximation matrix to an ideal personalized page ranking matrix. The methods and systems provided herein can be used to produce search results with particular relevance to an individual searcher.

13 Claims, 7 Drawing Sheets

PAGE 1

Link to Page 2
.....
.....
Link to Page 3
.....
.....
Link to Page 4

301

PAGE 2

Link to Page 1
.....
.....
.....
.....
Link to Page 4

302

PAGE 3

.....
Link to Page 4
.....
.....

303

PAGE 4

.....
.....
Link to Page 1
.....
.....
Link to Page 2

304

PAGE 5

.....
Link to Page 3
.....
.....
Link to Page 4
.....

PERSONALIZATION OF WEB PAGE SEARCH RANKINGS

FIELD OF THE INVENTION

This invention pertains generally to the field of Internet searching and more particularly ranking search results via matrix computations.

BACKGROUND OF THE INVENTION

The Internet presently comprises billions of web pages interconnected via hyperlinks. Users of the Internet typically use web browsing applications ("browsers") to navigate among these pages by either selecting and clicking hyperlinks, or by manually entering a "Uniform Resource Locator" ("URL") which allows the browser to access a particular web page directly. Often times, however, a user wishes to search the Internet for pages containing particular items of information. Because of the size of the Internet, it is impractical for a user to manually browse the Internet searching for relevant pages. Instead, users typically invoke search engines, which are computer applications developed for the purpose of searching the Internet. Search engines typically reside on server machines and accept queries from client users. A search engine is usually associated with an index of web pages, and, in response to a user query, returns a list of pages satisfying the query.

Although a search engine is a powerful tool in itself, primitive search engines struggled to produce relevant or useful results. For example, a query that was satisfied by hundreds or thousands of web pages could be of little value to the user, who may have to manually investigate each page. Some modern search engines, such as Google.com, attempt to "rank" search results by "popularity", and then to present the search results as a sorted list, so that the user is first presented with the most popular pages, which are presumably the most relevant.

Relevancy, however, is a criterion that is relative to the user. Pages that are generally popular may be of little interest to the user with particularly focused needs. Even the general user, whose needs are not particularly focused, will likely find some less popular pages more relevant than other more popular pages. Users would thus benefit from a way of personalizing the page-ranking process.

BRIEF SUMMARY OF THE INVENTION

Embodiments of the present invention provide methods and systems for producing personalized rankings of web pages or other interconnected objects. In accordance with one aspect of the invention, a system is provided for searching web pages, the system comprising a database for storing connectivity information about the web pages, and a page-grading engine associated with an approximation matrix Q', where Q' approximates an ideal matrix Q with respect to the connectivity information, and wherein the page-grading engine receives as input a personalization description v describing a set of preferences among the web pages, and grades search results with respect to Q' and v. In one embodiment, the approximation matrix Q' is a rank-k matrix whose representation comprises a singular value decomposition comprising matrices $U_k$, S and $V_k$ for a parameter k. In one version, v is a vector and Q' times v is an optimal approximation to Q times v over all rank-k matrices.

In accordance with another aspect of the invention, a method is provided for grading objects from an interconnected collection of weighted objects, the weights of the objects described by a description v, and the interconnection of the objects described by a matrix P, the method comprising applying a grading function Q' to the description v for the objects to determine a set of grades for the objects and assigning at least one object the corresponding determined grade for that object, wherein the grading function Q' approximates an ideal grading function Q, where applying ideal grading function Q to the set of weights v produces ideal grades with respect to description P for every object in the interconnected collection of weighted objects. In one embodiment, P, Q, and Q' are matrices, v is a vector, and the approximation is a low-rank optimal approximation. In one embodiment, entry P[i,j] in matrix P represents the probability of reaching one object i from another object j in one step of a random walk among the n weighted objects. In one embodiment, at each step of the random walk there is a fixed probability c that the walk will reset, and that the random walk then continues from object a with probability v[a]. In one embodiment, the ideal grade of an object b is the probability of arriving at object b at a step of the random walk. In one version, the objects are web pages.

In accordance with another aspect of the invention, a method is provided approximating a grading function Q with respect to a parameter k for use in a system of grading objects from an interconnected collection of weighted objects, comprising computing a matrix $U_k$, computing a matrix $V_k$, computing a diagonal matrix S, and defining the approximation to Q as the matrix product $V_k S U_k^T$, wherein the weights of the objects are described by a vector v, the interconnection of the objects is described by a matrix P, and the ideal grade of object i with respect to matrix P equals Q[i] times v where Q[i] is the ith row of an ideal matrix Q, In one embodiment, the method further comprises choosing a sufficiently large parameter d and computing an intermediate matrix M with respect to P, wherein matrix $U_k$, comprises the k principal eigenvectors of $dI-MM^T$ and matrix $V_k$ comprises the k principal eigenvectors of $dI-M^TM$, and wherein matrix $S=(dI-D)^{-1/2}$, where D is the diagonal matrix comprising the k eigenvalues corresponding to the k principal eigenvectors of $dI-MM^T$. In one embodiment, computing an intermediate matrix M with respect to P is further with respect to a constant c.

In accordance with another aspect of the invention, a system is provided for grading objects from an interconnected collection of weighted objects comprising a description v for describing the weights of the objects, a description P for describing the interconnection of the objects, and an object-grading engine for approximating an ideal grading function Q with an approximate function Q', where applying ideal grading function Q to the description v produces ideal grades with respect to description P for every object in the interconnected collection of weighted objects, and for assigning at least one object the grade produced for that object by an application of Q' to v. In one embodiment, the system further comprises a search engine in connection with the object-grading engine, wherein the object-grading engine grades objects passed from the search engine. In one version, the objects are web pages.

In accordance with another aspect of the invention, a computer-readable medium including computer-executable instructions is provided for facilitating the grading of web pages, the web pages interconnected corresponding to a matrix P, computer-executable instructions executing the steps of computing a representation of an approximation matrix Q' to an ideal matrix Q; and applying Q' to a personalization vector v to obtain grades of the web pages. In one embodiment, Q' is a rank-k matrix whose representation comprises a singular value decomposition comprising matrices $U_k$, S and $V_k$ for a parameter k. In one version, Q' times v is an optimal approximation to Q times v over all rank-k matrices.

In one embodiment, the computer-executable instructions further execute the steps of applying the grading of web pages produced by Q' to the results of a search query, and outputting the results of the search query sorted according the grading.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems to compute personalized page rankings will now be described with respect to preferred embodiments; however, the methods and systems of the present invention are not limited to interfaces between mobile connectivity services and device drivers. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
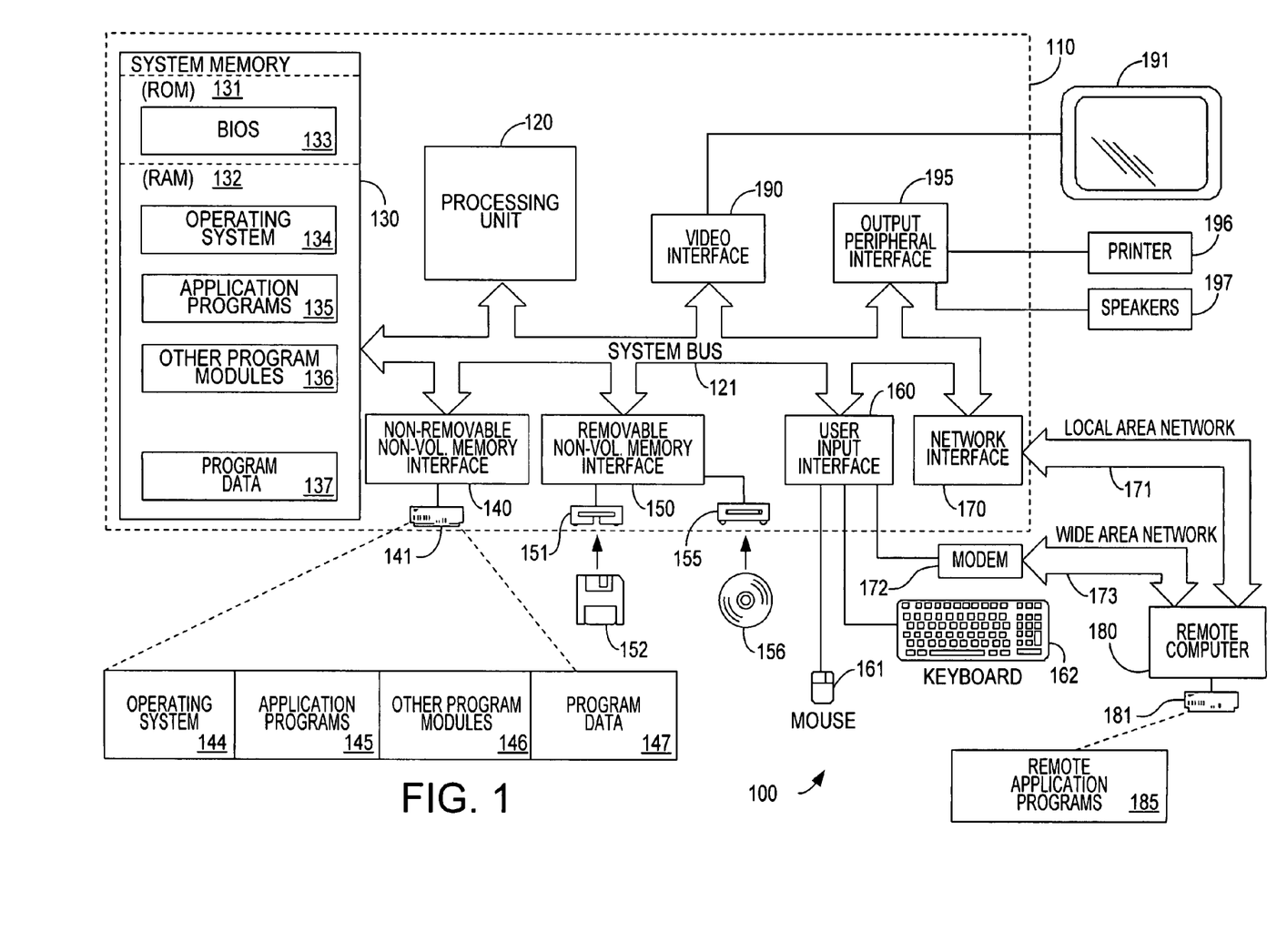
FIG. 1 is a simplified schematic illustrating an exemplary architecture of a computing device for carrying out personalized web page searching, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
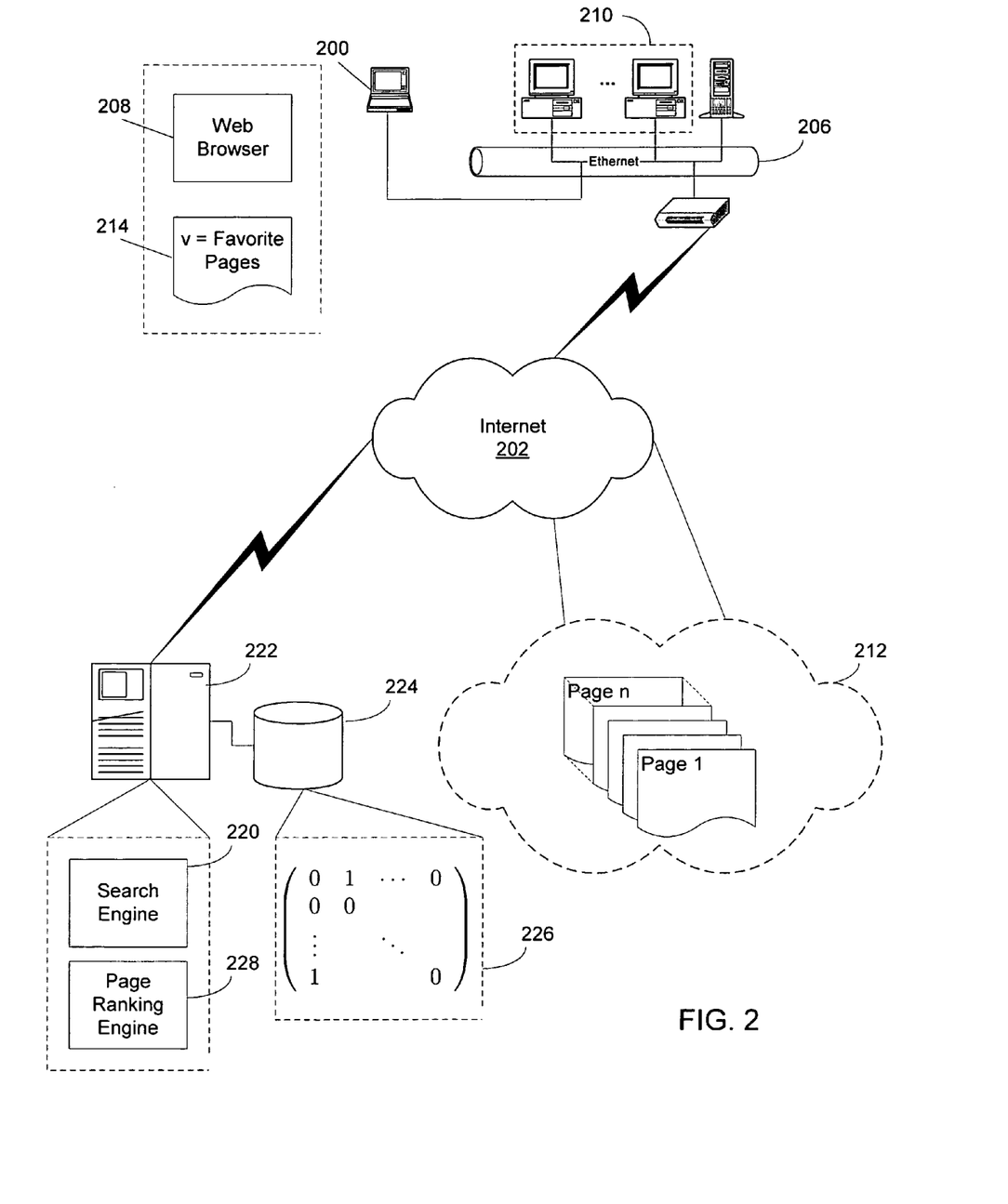
FIG. 2 is a diagram illustrating an arrangement of computing devices connected to the Internet for carrying out personalized web page searching, in accordance with an embodiment of the invention.

Turning to FIG. 2, a simple example of a computing environment is depicted wherein the invention is potentially exploited. In the illustrative environment, a computer 200 includes a network interface card (not specifically shown) facilitating communications over a communications medium. In the particular example depicted in FIG. 2, the computer 200 communicates with a local area network 206 via physical connection. Alternatively, the computer 200 could communicate with the local area network 206 via WWAN or WLAN media, or via other communications media.

The user of the computer 200, as a result of the supported network medium, is able to access the Internet 202. For example, the computer 200 accesses resources on the LAN 206 directly via physical connection to the LAN 206. The LAN 206 in the illustrative example is assumed to include network access and proxy servers that enable a properly authenticated user of the computer 200 to access resources of the Internet 202.

The Internet 202 is presented to the user of the computer 200 in the form of web pages. A web page contains content and instructions to be processed and displayed by a web browser application 208 residing on the computer 200. Alternatively, the web browser application 208 resides on a networked computer 210, and is graphically displayed on the computer 200 via a remote display program. Web pages also contain hyperlinks to other web pages, allowing a user to easily navigate from a displayed page to related pages by selecting a presented hyperlink. In this way, the hyperlinks on pages create a "web" of interconnected pages, whereby a user can navigate from one page to any of millions or billions of pages by a series of hyperlink selections. Although there may be several billion interconnected web pages accessible over the Internet 202, it is useful for purposes of the present invention to consider the pages as an ordered set of pages 212 numbered 1 to n, where n is the total number of pages accessible on the interconnected network of web pages. To aid users in keeping track of interesting web pages, web browser applications, such as Internet Explorer by MICROSOFT CORPORATION of Redmond, Wash., contain a "Favorites" or "Bookmarks" feature 214, whereby the user is able to store a list of web pages he is likely to access frequently, enabling easy navigation to those pages in the future.

Although a user is able to navigate to web pages merely by selecting hyperlinks, tools such as search engines exist to aid the user in finding particular information contained in web pages. In a typical scenario, the search engine 220 is housed in a server 222 connected to the Internet 202, and is also connected to a database 224 containing indices and information 226 about web pages on the Internet. In a typical search engine, such as Google (www.google.com), the user is presented with a web page on which he enters search parameters, usually in the form of search terms. The search engine 220 uses its database 224 to process the user request and in turn present the user with a new web page containing links to other pages that satisfied the parameters of the user's request.

When a large number of pages satisfy the search parameters, presenting the search results to the user in an organized manner may be problematic. A list of thousands of web pages in no particular order forces the user to painstakingly manually sort through the entire list to find relevant pages. Therefore, modern search engines often grade or "rank" pages based on presumed relevance to the user by using, for example, an incorporated page ranking engine 228. The web pages satisfying the search can then be sorted by presumed relevance, so that the user is presented with the most relevant results at the top of the result list.

Figure 3:
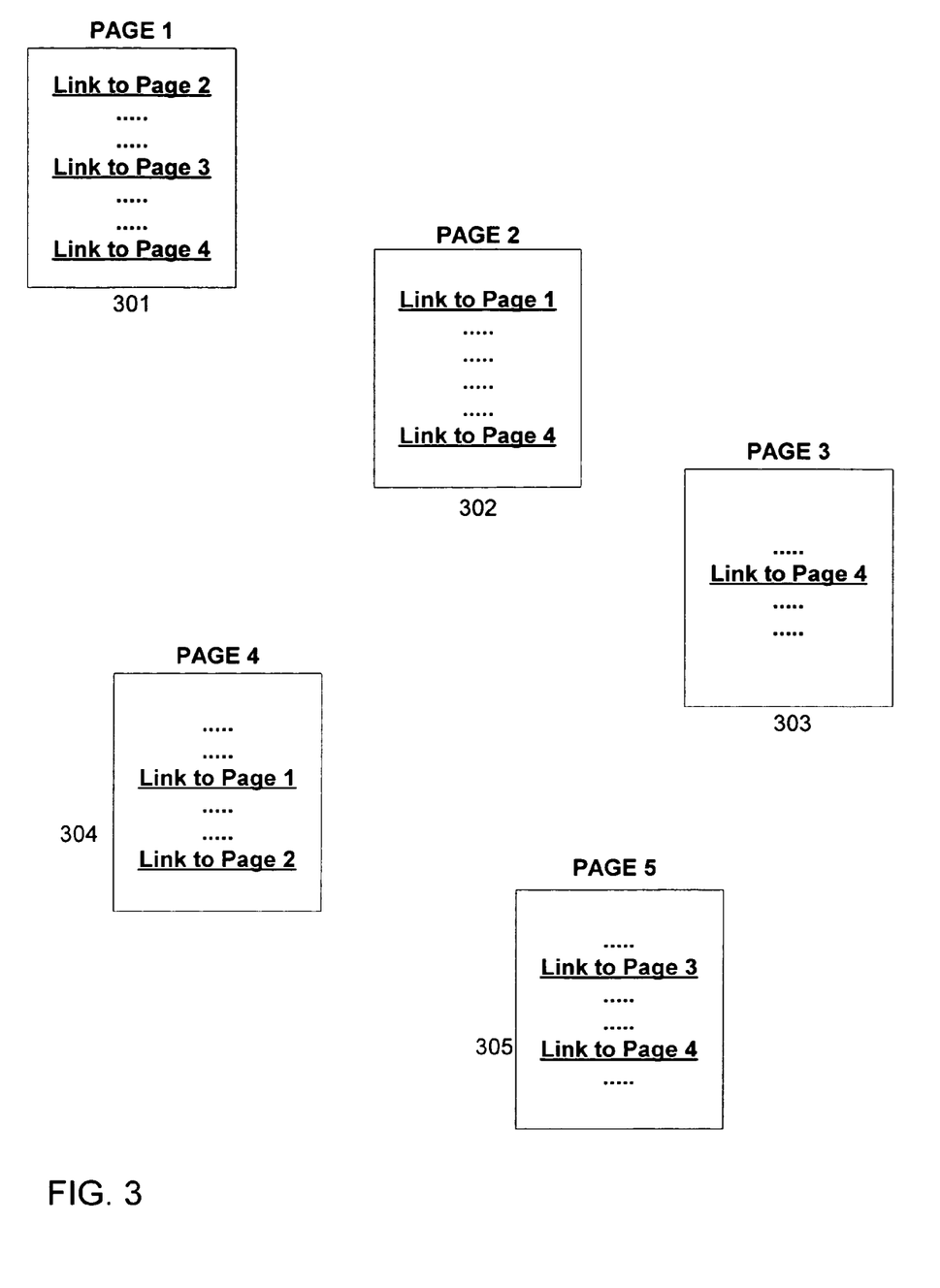
FIG. 3 is an example illustrating a collection of web pages, in accordance with an embodiment of the invention.

Determining the relevance of any particular web page, however, is not a trivial task. One approach to determining relevance looks at the structure of interconnectivity amongst pages on the Internet, to discover which pages are "popular" in that many other web pages contain hyperlinks leading to that page. The structure of interconnectivity can be stored on the database connected to the search engine in the form of a matrix, where entry [i,j] in the matrix indicates the presence of a hyperlink from page j to page i. An example of a connectivity matrix used to describe the interconnectivity among web pages, as used in an embodiment of the present invention, is now described with reference to FIG. 3. The universe of web pages in the example of FIG. 3 consists of only five web pages, for illustrative purposes. Page 1 301 contains hyperlinks to page 2 302, page 3 303 and page 4 304. Page 2 302 contains hyperlinks to page 1 301 and page 4 304. Page 3 303 contains only one hyperlink to page 4 304. Page 4 contains hyperlinks to page 1 301 and page 2 302. Page 5 contains hyperlinks to page 3 303 and page 4 304. In the example, this interconnectivity is described by the matrix $$\begin{pmatrix} 0 & 1 & 0 & 1 & 0 \\ 1 & 0 & 0 & 1 & 0 \\ 1 & 0 & 0 & 0 & 1 \\ 1 & 1 & 1 & 0 & 1 \\ 0 & 0 & 0 & 0 & 0 \end{pmatrix}$$

where an element at row i, column j is 1 if an only if there is link from page j to page i. If a hyperlink is chosen uniformly at random from a page, then there is a corresponding probability P[i,j] of going from page j to page i when a hyperlink is chosen. The corresponding matrix P is:

$$P = \begin{pmatrix} 0 & 0.5 & 0 & 0.5 & 0 \\ 0.33 & 0 & 0 & 0.33 & 0 \\ 0.33 & 0 & 0 & 0 & 0.5 \\ 0.33 & 0.5 & 1 & 0 & 0.5 \\ 0 & 0 & 0 & 0 & 0 \end{pmatrix}.$$

The sum of each column of matrix P equals 1. The present invention is not limited, however, to choosing a hyperlink uniformly at random within a page. Any arbitrary probability distribution may be applied to the choosing of hyperlinks within any particular page. For example, if statistical data is known about actual usage patterns, that information can be applied in assigning the probabilities contained in P.

Given that the Internet currently comprises billions of pages, and the vast majority of these pages do not contain hyperlinks between them, matrix P as used in practice outside this example will be a sparse matrix containing mostly zero-entries. The sparseness property is useful because it allows for compression techniques to store the matrix efficiently. In addition to sparseness, another important matrix concept is the "rank" of a matrix, a mathematical term unrelated to a web page's "pagerank" or "rank" of an individual web page. The rank of a matrix is the number of linearly independent columns (or rows) of the matrix. For practical purposes, matrices of lower rank can be stored more efficiently than matrices of higher rank—a n×n matrix of rank-k contains information requiring on the order of kn storage, rather than the order of $n^2$ storage potentially required by a matrix of rank-n.

Alternatively, the connectivity among the pages may be considered in the form of a graph containing vertices and directed edges. In this manner, each vertex represents a web page, and each directed edge represents a hyperlink between pages. By assigning weights to the edges, a probability distribution among a page's hyperlinks can be represented.

Several existing methods for ranking web pages utilize the notion of a theoretical "random walk" among the web pages of the Internet. Generally, a random walk can be thought of as starting at some web page k and then selecting a hyperlink to page k with some probability P[j,k]. The walk continues from page j by selecting a hyperlink to another page i, with some probability P[i, j]. The theoretical random walk continues indefinitely. By performing mathematical manipulations on the matrix P, a search engine can rank a page based on the probability of arriving at the page at a step of the random walk. To avoid being trapped in a "dead-end" or a small set of internally linked pages, some existing methods for ranking pages include a constant reset factor c. At each step of the walk, there is a probability c of jumping to any random page of the Internet. This "teleportation" feature ensures that the walk will eventually continue despite hitting a dead-end. The choice of c is important, however, since a very small reset factor has little impact on the random walk, while too large of a reset factor results in too many jumps, ignoring the structure of interconnections among the pages. Empirically, an approximate value of c=0.15 (about a one in six chance of resetting) has been found to produce satisfactory results in real-world test environments.

Although existing methods are able to statically rank web pages, they tend to equate relevance with popularity, and they do not account for relevance with respect to an individual user's preferences. For example, if a boater enters the search terms "Lake Michigan" into a search engine, he will be given the same search results as would a hydroelectric engineer entering those terms. Yet the boater and hydroelectric engineer likely have very different criteria for determining the relevance of those results.

Figure 4:
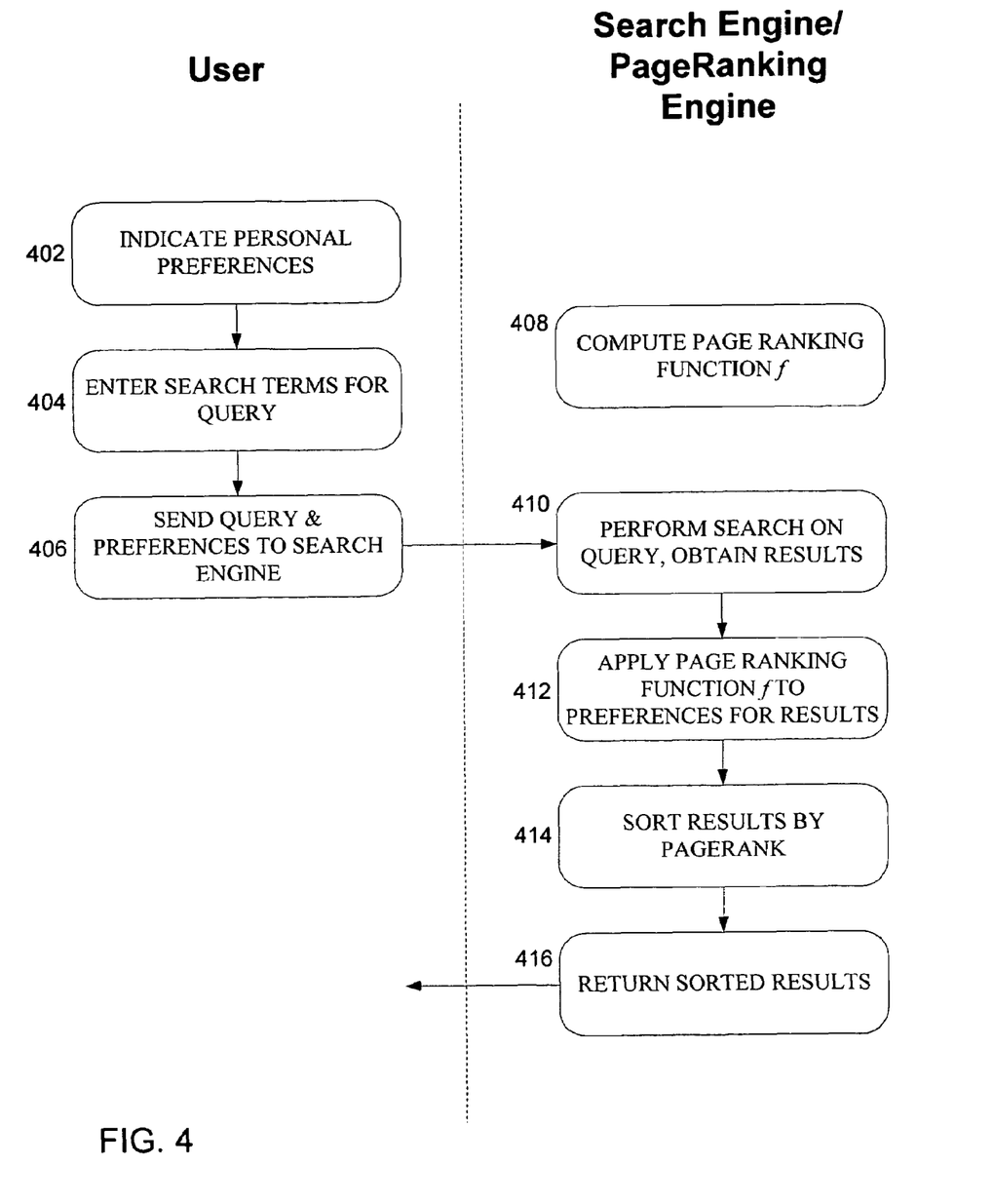
FIG. 4 is a flow diagram illustrating a method of ranking results of a search query, in accordance with an embodiment of the invention.

A general method of using a search engine to produce relevant results to a search query, in accordance with an embodiment of the invention, is now described with reference to FIG. 4. Prior to querying the search engine, the user has indicated a set of personalized preferences at step 402. The set of preferences form a basis with which relevance of the search results is to be determined. The user enters search terms at step 404 and sends the query along with his set of preferences to the search engine at step 406. A page ranking engine, prior to receiving the query, has computed at step 408 a page ranking function $f$ based on the interconnectivity (and possibly other statistical data) of web pages on the Internet. The page ranking function $f$ takes as input a set of preferences and outputs a ranking of web pages with respect to the set of preferences. In a preferred embodiment, the page ranking function $f$ is computed as an easily manipulable approximation to an ideal page ranking function. After receiving the query, the search engine performs the search on the given search terms and obtains the results at step 410. The page ranking engine then takes the results at step 412 and applies the page ranking function $f$ to the user's set of preferences to obtain a pagerank for each of the results. The grading engine then sorts the results by pagerank at step 414 and returns the sorted results to the user at step 416.

In accordance with an embodiment of the present invention, a user's personalized preferences are represented by a vector v. Vector v is a n×1 vector where entry v[i] is the user's preference for page i. If the user does not consider page i relevant, entry v[i] is 0. Given that the Internet currently comprises billions of pages, and an individual user will not have seen the vast majority of these pages, vector v is a sparse vector, populated mostly with zeroes. In one embodiment, the non-zero entries of vector v correspond to the "Favorites" list 214 associated with the user's web browser 208. Generally, the personalized preference vector v is used in conjunction with a random walk and reset factor c. At each step of the random walk, there is a probability c of jumping off the current page, and, given the jump is to take place, a probability v[i] of jumping to page i. This forces the random walk to stay relatively "close" to the set of pages described by non-zero entries of v. Vector v is therefore a normal vector to ensure the sum of its entries is 1. In one embodiment, the m non-zero entries of v each have value 1/m. Alternatively, the non-zero entries of v are allowed to have differing values, so that a user or program can indicate some pages are more favored than others. In the example of the boater and the hydroelectric engineer, the boater's preferences might include pages about boating, fishing, and navigational equipment. The engineer's preferences might include pages about power plants, dams, and engineering societies. The same search terms now produce different results, since relevance is determined relative to the individual preferences.

The personalized pagerank with respect to a user's personalized preference vector v is denoted by ppr(v) and defined to be the function that takes as input a vector v and outputs a vector r such that r[i] is the probability of arriving at page i during any step of a random walk among the pages, where there is a fixed probability c at each step that the walk will "jump" to page j with probability v[j]. Because it represents an exact probability of arriving at page i, r[i] is an "ideal" grade or rank for page i relative to v. It can be shown mathematically that there exists a n×n personalized pagerank matrix Q (where n is the number of web pages) such that Qv=ppr(v). An example of the calculation and use of a personalized pagerank matrix is as follows. Given connectivity matrix $$P = \begin{pmatrix} 0 & 0.5 & 0 & 0.5 & 0 \\ 0.33 & 0 & 0 & 0.33 & 0 \\ 0.33 & 0 & 0 & 0 & 0.5 \\ 0.33 & 0.5 & 1 & 0 & 0.5 \\ 0 & 0 & 0 & 0 & 0 \end{pmatrix}$$

and a reset factor of c=0.15, matrix (I−(1−c)P) is calculated to be $$(I - (1-c)P) = \begin{pmatrix} 1 & -0.43 & 0 & -0.43 & 0 \\ -0.28 & 1 & 0 & -0.43 & 0 \\ -0.28 & 0 & 1 & 0 & -0.43 \\ -0.28 & -0.43 & -0.85 & 1 & -0.43 \\ 0 & 0 & 0 & 0 & 1 \end{pmatrix}.$$

The inverse of matrix (I−(1−c)P) is the multiplied by c, and result is personalized pagerank matrix $$Q = \begin{pmatrix} 0.37 & 0.28 & 0.23 & 0.28 & 0.22 \\ 0.23 & 0.35 & 0.21 & 0.25 & 0.19 \\ 0.11 & 0.08 & 0.22 & 0.08 & 0.13 \\ 0.29 & 0.29 & 0.34 & 0.40 & 0.31 \\ 0 & 0 & 0 & 0 & 0.15 \end{pmatrix}.$$

Applying the matrix Q to different personalized preference vectors v produces different resulting pageranks. For example, when page 5 is preferred by the user, vector v is $$v = \begin{pmatrix} 0 \\ 0 \\ 0 \\ 0 \\ 1 \end{pmatrix}, \text{ and thus } Qv = \begin{pmatrix} 0.216 \\ 0.195 \\ 0.125 \\ 0.314 \\ 0.150 \end{pmatrix}.$$

Page 2 is accordingly assigned a pagerank of 0.195. With a different personalized preference vector v, for example when all the pages in the example are preferred equally, however, then page 2 is assigned a pagerank of 0.247, since $$v = \begin{pmatrix} 0.2 \\ 0.2 \\ 0.2 \\ 0.2 \\ 0.2 \end{pmatrix} \text{ implies } Qv = \begin{pmatrix} 0.274 \\ 0.247 \\ 0.121 \\ 0.328 \\ 0.03 \end{pmatrix}.$$

This indicates that page 2 is less "relevant" to the user who prefers page 5 over all others.

In practice, however, the size and density of Q prohibit efficient manipulation, calculation and storage of Q, which contains on the order of sextillions of non-zero entries. An embodiment of the present invention approximates Q with a matrix $Q_k$. The approximation matrix $Q_k$ is computed as a Singular Value Decomposition such that $Q_k = V_k S U_k^T$, where each of $U_k$, S and $V_k$ are efficiently calculated, stored, and manipulated. The resulting approximation can then be applied to an individual user's preference to calculate a personalized pagerank vector $r_k$ that can be used for ranking web pages. Because $Q_k$ is an approximation of Q, similarly $r_k[i]$ is an approximation of ideal rank r[i]. However, an embodiment of the invention uses an optimal low-rank approximation, ensuring that $r_k[i]$ is a good approximation of r[i] in both the worst-case and on average over all web pages i, as formalized below.

In more detail, an embodiment of the invention operates under the mathematical observation that the optimal low-rank approximation of a matrix Q is equal to the inverse of the least optimal low-rank approximation to $Q^{-1}$. As a further observation, the least optimal low-rank approximation to a matrix M can be recovered from the optimal low-rank approximation to (dI-MM$^T$) for sufficiently large d: eigenvalues that are small in MM$^T$ are large in (dI-MM$^T$), so orthogonal iteration can be used to find the strongest eigenvalues and eigenvectors of (dI-MM$^T$), which are the weakest eigenvalues and eigenvectors of MM$^T$. Thus, these eigenvalues and eigenvectors can be used in a Singular Value Decomposition which is a least optimal low-rank approximation of M. Combining these observations with the observation that $Q^{-1} = (1/c)(I-(1-c)P)$, an embodiment of the present invention computes $Q_k$ as the inverse of the least optimal low-rank approximation of $M = Q^{-1} = (1/c)(I-(1-c)P)$.

In one embodiment of the invention, approximation matrix $Q_k = V_k S U_k^T$ is computed in an offline process and stored on a computer associated with a search engine. An individual user's personal preference vector v is stored on the user's computer. When the user queries the search engine, his computer sends the query along with preference vector v to the search engine. The search engine or an associated matrix processing engine then computes $Q_k v$ by using the easily manipulable decomposition, $V_k S U_k^T v$, to produce a personalized pagerank $r_k$. The search engine performs the search and sorts the results according to personalized pagerank $r_k$, and the sorted results are then returned to the user.

The application of the present invention is not confined to ranking web pages, however. The invention is equally applicable to any set of interconnected objects where "random walk" probabilities are to be determined with respect to an individual set of preferences. For example, the invention could be applied in ranking individuals within a social network, or in identifying important resources on an electrical grid or telecommunications network.

Figure 5:
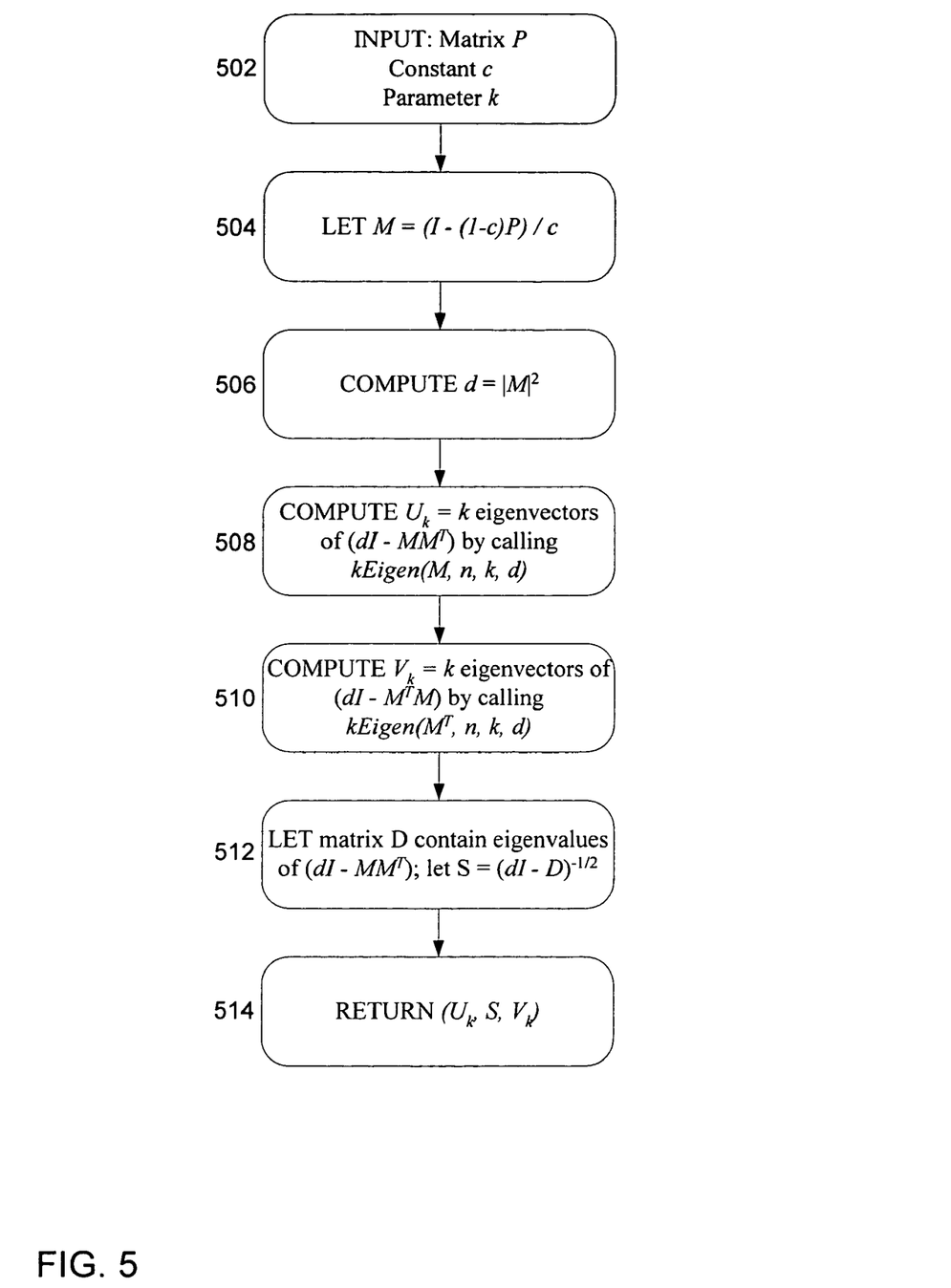
FIG. 5 is a flow diagram illustrating a method for computing an approximation matrix for computing personalized page rankings, in accordance with an embodiment of the invention.

In greater detail, a method is now described with reference to FIG. 5 for computing an optimal low-rank approximation $Q_k$ to personalized pagerank matrix Q, in accordance with an embodiment of the invention. The method takes as input a n×n connectivity matrix P, a constant c, and a parameter k, in an input step 502. An intermediate matrix M is set to equal 1/c times (I−(1−c)P), where I is the n×n identity matrix, in step 504. A large value d is computed by finding the norm of M and squaring it at step 506. Any known method may be used to compute the norm of M, such as computing the square root of the largest eigenvalue of MM$^T$. At step 508, matrix M is used to compute the k principal eigenvectors of dI-MM$^T$, which are the "right singular vectors" of $Q_k$, by calling the procedure kEigen(M, n, k, d), described herein with respect to FIG. 6. These k principal eigenvectors are stored as the columns of matrix $U_k$. At step 510, the transpose M$^T$ of matrix M is used to compute the k principal eigenvectors of dI-M$^T$M, which are the "left singular vectors" of $Q_k$, by calling the procedure kEigen(M$^T$, n, k, d), described herein with respect to FIG. 6. These k eigenvectors are stored as the columns of matrix $V_k$. By using the kEigen procedure as described, the singular vectors of $Q_k$ can be computed without knowledge of $Q_k$. At step 512 the matrix D is set as the matrix whose diagonal entry D[i, i] is the eigenvalue corresponding to the ith eigenvector of dI-MM$^T$, that is, column i of $U_k$. Matrix S is then computed to equal the inverse of the square root of matrix D, such that S[i, i] =1/ sqrt(D[i,i]). The three matrices $U_k$, S, and $V_k$ are returned to the method caller in return step 514. The matrices returned form a Singular Value Decomposition of the approximation matrix $Q_k$, and thus have the property that $V_k S U_k^T = Q_k$. Since all three matrices are small and/or sparse ($U_k$ and $V_k$ each have only k columns; S is a k×k diagonal matrix), they can all be efficiently stored and manipulated. Furthermore, it can be shown mathematically that approximation matrix $Q_k$ is the optimal matrix of rank-k for approximating Q. The method described in FIG. 5 thus introduces the least possible error a rank-k approximation can introduce in the worst case scenario, and in the average case scenario. More precisely, for any rank-k matrix $M_k$, max$_{unit\ vector\ x}$|Q−$Q_k$x|≦max$_{unit\ vector\ x}$|Q−$M_k$x| and avg$_{unit\ vector\ x}$|Q−$Q_k$x|≦avg$_{unit\ vector\ x}$|Q−$M_k$x| where |v| is computed under the $l_2$, or Euclidean norm.

Figure 6:
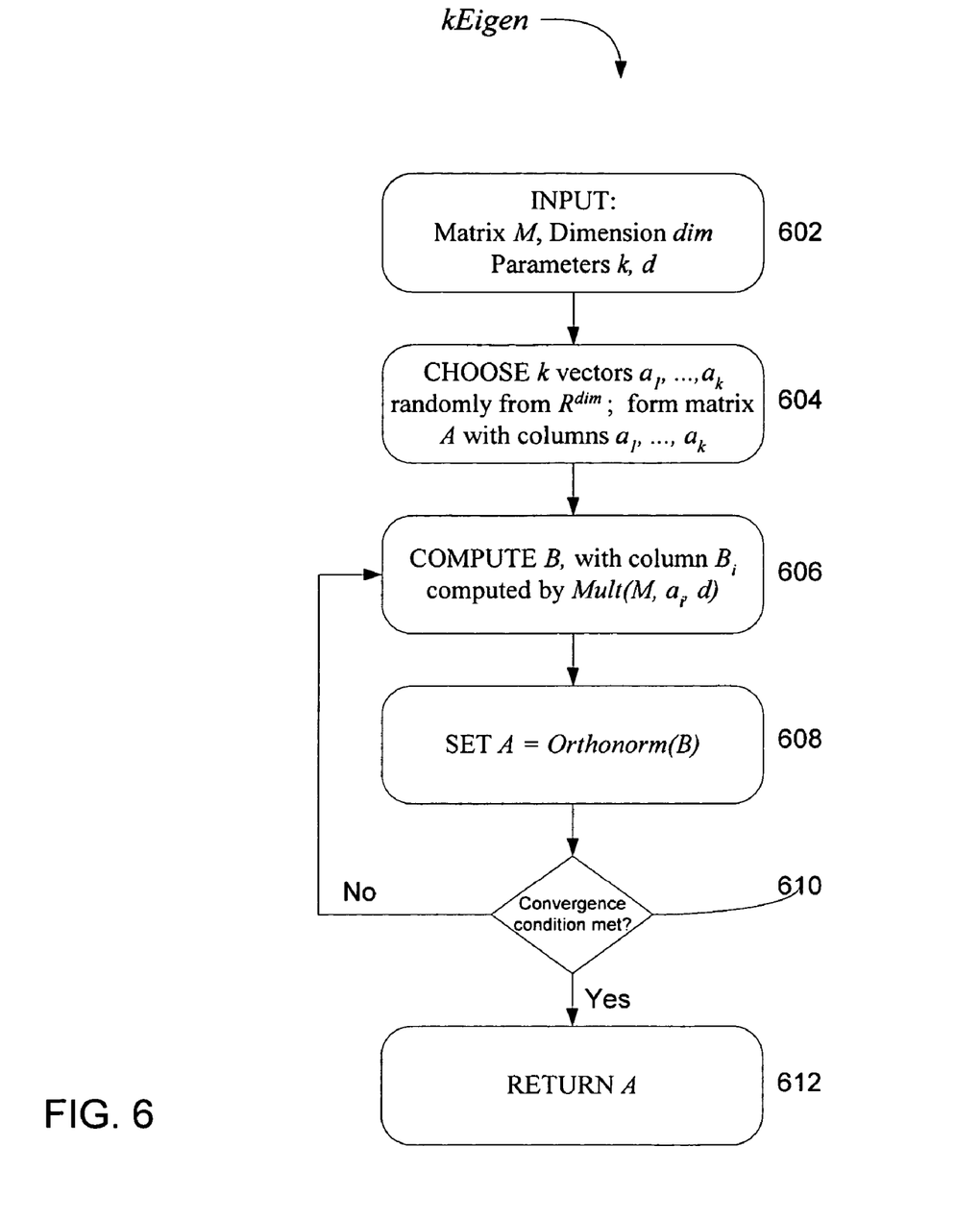
FIG. 6 is a flow diagram illustrating a kEigen procedure used in computing an approximation matrix for computing personalized page rankings, in accordance with an embodiment of the invention.

Turning attention to FIG. 6, the kEigen procedure, used in step 508 and step 510 to compute k eigenvectors, in accordance with an embodiment of the invention, is now described. The procedure works via orthogonal iteration to compute eigenvectors. The procedure takes as input a matrix M, a dimension dim, and parameters k and d in an input step 602. At step 604, a matrix A is formed by choosing k vectors $a_1$, $a_2$, ..., $a_k$ at random from R$^{dim}$ and using these vectors as the columns of A. A new matrix B is then computed at step 606 by calling the procedure Mult(M, $a_i$, d), described herein with reference to FIG. 7, to compute the ith column of B. The Mult procedure is thus called k times, with values of i ranging from 1 to k. The computed matrix B is then orthonormalized at step 608 to produce a new matrix, which is labeled A with columns labeled $a_1$, $a_2$, ..., $a_k$. The orthonormalization in step 608 is preferably performed using known algorithms for orthonormalizing, such as the well-known Gram-Schmidt algorithm. A convergence condition is checked at step 610. In one embodiment, the convergence condition is checked by comparing the Frobenius norm of AA$^T$ to the square root of k for 10 successive iterations. If the convergence condition has not been satisfied, the process proceeds with another iteration by returning to step 606. Otherwise, the matrix A, whose columns are k eigenvectors of (dI-M$^T$M), is returned at step 612.

Figure 7:
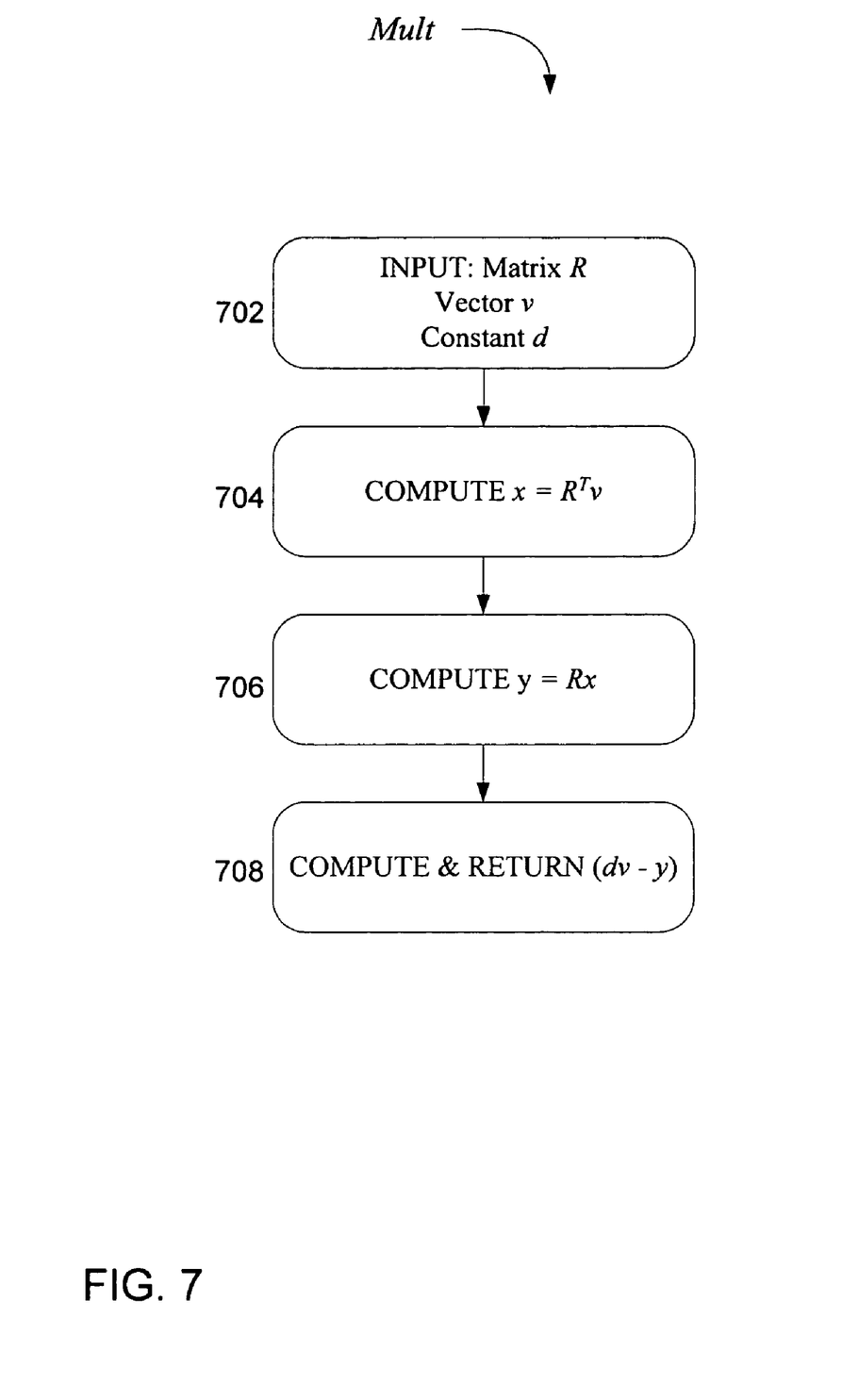
FIG. 7 is a flow diagram illustrating a Mult procedure used in a kEigen procedure, used in computing an approximation matrix for computing personalized page rankings, in accordance with an embodiment of the invention.

Turning to FIG. 7, the Mult function is described, as used in accordance with an embodiment of the invention. The Mult function takes as input a matrix R, a vector v and a parameter d in an input step 702. At step 704, a vector x is computed as $R^T v$. At step 704, matrix R is multiplied by x to form new vector y. The vector dv−y is then computed and returned at step 708. In this manner, Mult(R, v, d) efficiently computes $dv - R^T RV = (dI - R^T R)v$.

An example of applying the above described functions in accordance with an embodiment of the invention is now described. The example uses the same input matrix $$P = \begin{pmatrix} 0 & 0.5 & 0 & 0.5 & 0 \\ 0.33 & 0 & 0 & 0.33 & 0 \\ 0.33 & 0 & 0 & 0 & 0.5 \\ 0.33 & 0.5 & 1 & 0 & 0.5 \\ 0 & 0 & 0 & 0 & 0 \end{pmatrix}$$

as in the example above. In the example, k is 2 and constant c is 0.15. The intermediate matrix $$M = \begin{pmatrix} 6.67 & -2.83 & 0 & -2.83 & 0 \\ -1.89 & 6.67 & 0 & -2.83 & 0 \\ -1.89 & 0 & 6.67 & 0 & -2.83 \\ -1.89 & -2.83 & -5.67 & 6.67 & -2.83 \\ 0 & 0 & 0 & 0 & 6.67 \end{pmatrix}$$

is computed according to step 502. The norm of this matrix is 11.2466, so the value d is the square of the norm, which is 128.486. The right and left singular vectors (eigenvectors of $dI - M^T M$ and $dI - MM^T$) are computed according to steps 508 and 510, and stored as matrices $$U_k = \begin{pmatrix} -0.344 & 0.461 \\ -0.535 & 0.463 \\ 0.398 & 0.436 \\ -0.057 & 0.477 \\ 0.658 & 0.395 \end{pmatrix} \text{ and } V_k = \begin{pmatrix} -0.327 & 0.541 \\ -0.413 & 0.487 \\ 0.506 & 0.233 \\ 0.358 & 0.643 \\ 0.518 & 0.052 \end{pmatrix}.$$

Matrix $$D = \begin{pmatrix} 91.83 & 0 \\ 0 & 125.72 \end{pmatrix}$$

is assigned the corresponding eigenvalues of $dI - M^T M$, and is used to compute diagonal matrix $$S = \begin{pmatrix} 0.170 & 0 \\ 0 & 1.141 \end{pmatrix}$$

according to step 512. The three matrices $V_k$, S and $U_k^T$ when multiplied form the approximation $$Q_k = \begin{pmatrix} 0.304 & 0.315 & 0.247 & 0.298 & 0.207 \\ 0.280 & 0.295 & 0.215 & 0.269 & 0.173 \\ 0.093 & 0.077 & 0.150 & 0.122 & 0.161 \\ 0.317 & 0.307 & 0.344 & 0.346 & 0.330 \\ -0.007 & -0.026 & 0.065 & 0.023 & 0.088 \end{pmatrix},$$

which differs from the ideal matrix Q by total squared error of 0.0348, as compared to the total squared magnitude of Q, which is 1.3021. $Q_k$ is a matrix of rank-2, and is the optimal approximation of Q over all matrices of rank-2—any other matrix of rank-2 will have a total squared error at least 0.0348.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A system for searching web pages comprising:
a database for storing connectivity information about the web pages; and
a processor-implemented page-grading engine associated with an approximation matrix Q', where Q' approximates an ideal matrix Q with respect to the connectivity information; wherein:
the page-grading engine receives as input a personalization description v describing a set of preferences of a particular user from among the web pages and a set of search results from among the web pages based on a query from the user, and grades the set of search results for the user with respect to Q' and v such that v and the set of search results is applied to Q to result in a page rank for each search result in the set, sorting the set of search results by page rank, and returning the sorted set to the user;
non-zero entries of a vector indicative of the personalization description v correspond at least to a list of favorite web pages of the user as obtained from a web browser of the user; and
the page-grading engine grades the web pages as grading objects from an interconnected collection of weighted objects by appoximately the matrix Q with respect to a parameter k, by computing a matrix $U_k$, computing a matrix $V_k$, computing a diagonal matrix S, and defining Q' as the matrix product $V_k S U_K^T$.

2. The system of claim 1 wherein approximation matrix Q' is a rank-k matrix whose representation comprises a singular value decomposition comprising matrices $V_k$, S and $U_k^T$ for a parameter k.

3. The system of claim 2 wherein v is a vector and Q' times v is an optimal approximation to Q times v over all rank-k matrices.

4. The system of claim 1 wherein the page-grading engine grades the web pages as objects from an interconnected collection of weighted objects, the weights of the objects described by the personalization description v, and the interconnection of the objects described by a description P, the page-grading engine:

applying the grading function Q' to the personalization description v for the objects to determine a set of grades for the objects;

assigning at least one object the corresponding determined grade for that object;

wherein applying ideal grading function Q to the personalization description v produces ideal grades with respect to description P for every object in the interconnected collection of weighted objects.

5. The system of claim 4 wherein P, Q, and Q' are matrices, v is a vector, and the approximation is a low-rank optimal approximation.

6. The system of claim 5 wherein entry P in matrix P represents the probability of reaching one object i from another object j in one step of a random walk among the weighted objects.

7. The system of claim 6 wherein at each step of the random walk there is a fixed probability c that the walk will reset, and that the random walk then continues from object a with probability v.

8. The system of claim 7 wherein the ideal grade of an object b is the probability of arriving at object b at a step of the random walk.

9. The system of claim 1 wherein:

the page-grading engine further determines a grade for at least one of the objects using Q'; wherein the weights of the objects are described by the vector indicative of the personalization description v, the interconnection of the objects is described by a matrix P, and the ideal grade of object i with respect to matrix P equals Q times v where Q is the ith row of an ideal matrix Q.

10. The system of claim 9 further comprising:

choosing a sufficiently large parameter d; and computing an intermediate matrix M with respect to P; wherein matrix $U_k$, comprises the k principal eigenvectors of $dI-MM^T$ and matrix $V_k$ comprises the k principal eigenvectors of $dI-M^TM$, and wherein matrix $S=(dI-D)^{-1/2}$, where D is the diagonal matrix comprising the k eigenvalues corresponding to the k principal eigenvectors of $dI-MM^T$.

11. The system of claim 10 wherein computing an intermediate matrix M with respect to P is further with respect to a constant c.

12. The system of claim 1 wherein the page-grading engine grades the web pages as objects from an interconnected collection of weighted objects, the page-grading engine comprising:

the personalization description v of the weights of the objects;

a description P of the interconnection of the objects; and a processor for approximating, using the ideal matrix Q and the approximation matrix Q', an ideal grading function Q with an approximate function Q', where applying ideal grading function Q to the personalization description v produces ideal grades with respect to the description P for every object in the interconnected collection of weighted objects, and for assigning at least one object the grade produced for that object by an application of Q' to v.

13. The system of claim 12 further comprising a search engine in connection with the object-grading engine, wherein the object-grading engine grades objects passed from the search engine.

* * * * *